US012759935B2

(12) United States Patent
Stremmel

(10) Patent No.: US 12,759,935 B2
(45) Date of Patent: Oct. 13, 2026

(54) CAUSTIC BASED MATERIAL BUILDING METHODS AND APPARATUS

(71) Applicant: Elkhorn Capital Holdings LLC, Las Vegas, NV (US)

(72) Inventor: Randall Stremmel, Cypress, TX (US)

(73) Assignee: Elkhorn Capital Holdings LLC, Las Vegas, NV (US)

( * ) Notice: Subject to any disclaimer, the term of this patent is extended or adjusted under 35 U.S.C. 154(b) by 537 days.

(21) Appl. No.: 18/190,802

(22) Filed: Mar. 27, 2023

(65) Prior Publication Data

US 2024/0327283 A1 Oct. 3, 2024

(51) Int. Cl.
*C04B 18/08* (2006.01)
*B28B 3/02* (2006.01)

(52) U.S. Cl.
CPC ................ *C04B 18/08* (2013.01); *B28B 3/02* (2013.01)

(58) Field of Classification Search
None
See application file for complete search history.

(56) References Cited

U.S. PATENT DOCUMENTS 5,704,972 A * 1/1998 Ivkovich ................ C04B 28/18 106/710

FOREIGN PATENT DOCUMENTS

WO WO-2017175240 A1 * 10/2017 ........... C04B 28/021

OTHER PUBLICATIONS

Qin et al. “Effect of low molarity alkaline solution on the compressive strength of fly ash based geopolymer concrete”. International Journal of Sustainable Building Technology and Urban Development. Jun. 30, 2022. 155-164. Obtained online. URL: https://www.sbt-durabi.org/articles/XML/YwvN/ (Year: 2022).*

Ranjbar et al. “Effects of heat and pressure on hot-pressed geopolymer”. Construction and Building Materials vol. 231, Jan. 20, 2020, (Year: 2020).*

Nagaraj et al. “Assessing the performance of molarity and alkaline activator ratio on engineering properties of self-compacting alkaline activated concrete at ambient temperature”. Journal of Building Engineering vol. 20, Nov. 2018, pp. 137-155 (Year: 2018).*

* cited by examiner

*Primary Examiner* — Christopher T Schatz

(57) ABSTRACT

Embodiments presented provide for a method of making a material building block using a caustic material within the matrix of the material. In embodiments, dry ingredients are mixed together, followed by steps of adding the caustic material the mixed dry ingredients. The resulting mixture may be cured into shapes or forms conducive to be used as building materials.

13 Claims, 5 Drawing Sheets

| Description | Caustic | Absorption | | | | | | | |
|---|---|---|---|---|---|---|---|---|---|
| | | Brick # 1 | Brick # 2 | Brick # 1 | Brick # 2 | # 1 | # 2 | # 1 | # 2 |
| | Molar | 1 hour (lbs./ft.3) | | 24 hour (lbs./ft.3) | | 1 hour (%) | | 24 hour (%) | |
| 50% WV FA(7132-1)/50%Niles BA/PMET Lime/20ml 16.0 M NaOH - Pressed @ 5000psi | 16.0 | 5.2 | 5.3 | 11.1 | 11.2 | 4.2 | 4.2 | 9.1 | 8.9 |
| 50% WV FA(7132-1)/50%Niles BA/PMET Lime/20ml 14.0 M NaOH - Pressed @ 5000psi | 14.0 | 5.3 | 4.9 | 10.9 | 10.5 | 4.2 | 3.9 | 8.7 | 8.4 |
| 50% WV FA(7132-1)/50%Niles BA/PMET Lime/20ml 12.0 M NaOH - Pressed @ 5000psi | 12.0 | 5.3 | 5.6 | 11.7 | 11.6 | 4.3 | 4.4 | 9.4 | 9.1 |
| 50% WV FA(7132-1)/50%Niles BA/PMET Lime/20ml 10.0 M NaOH - Pressed @ 5000psi | 10.0 | 5.0 | 4.6 | 10.9 | 10.4 | 4.1 | 3.7 | 8.3 | 8.8 |
| 50% WV FA(7132-1)/50%Niles BA/PMET Lime/20ml 8.0 M NaOH - Pressed @ 5000psi | 8.0 | 6.2 | 6.3 | 11.4 | 11.3 | 4.9 | 4.9 | 9.1 | 8.8 |
| 50% WV FA(7132-1)/50%Niles BA/PMET Lime/20ml 6.0 M NaOH - Pressed @ 5000psi | 6.0 | 6.3 | 5.8 | 10.9 | 11.2 | 4.8 | 4.6 | 8.4 | 8.8 |
| 50% WV FA(7132-1)/50%Niles BA/PMET Lime/20ml 4.0 M NaOH - Pressed @ 5000psi | 4.0 | 5.8 | 6.2 | 11.2 | 11.2 | 4.6 | 4.8 | 9.0 | 8.7 |
| 50% WV FA(7132-1)/50%Niles BA/PMET Lime/20ml 3.0 M NaOH - Pressed @ 5000psi | 3.0 | 6.7 | 6.8 | 10.9 | 11.1 | 5.5 | 5.6 | 8.9 | 9.1 |
| 50% WV FA(7132-1)/50%Niles BA/PMET Lime/20ml 2.0 M NaOH - Pressed @ 5000psi | 2.0 | 8.4 | 8.1 | 11.8 | 11.7 | 6.8 | 6.7 | 9.6 | 9.6 |
| 50% WV FA(7132-1)/50%Niles BA/PMET Lime/20ml 1.0 M NaOH - Pressed @ 5000psi | 1.0 | 12.4 | 12.4 | 14.9 | 15.1 | 10.7 | 10.7 | 12.8 | 13.0 |
| 50% WV FA(7132-1)/50%Niles BA/PMET Lime/20ml H2O - Pressed @ 5000psi | 0.0 | 16.2 | 16.2 | 17.9 | 17.8 | 14.1 | 14.1 | 15.6 | 15.6 |

Compression Strength (psi.) Pressed @ 5000psi w/12% Ca(OH)2

| Description | Mix | FA | BA | SW | Caustic | Brick # 1 | Brick # 2 |
|---|---|---|---|---|---|---|---|
| WV FA(7132-1)/Niles BA | D | 0.5 | 0.5 | | 16.0 | 8,465 | >10,000* |
| WV FA(7132-1)/Niles BA | C | 0.5 | 0.5 | | 14.0 | 7,890 | >10,000* |
| WV FA(7132-1)/Niles BA24 hour air-dry | E | 0.5 | 0.5 | | 14.0 | 7,484 | |
| WV FA(7132-1)/Niles BA | B | 0.5 | 0.5 | | 12.0 | 7,314 | >10,000* |
| WV FA(7132-1)/Niles BA | F | 0.5 | 0.5 | | 10.0 | 6,497 | >10,000* |
| WV FA(7132-1)/Niles BA | G | 0.5 | 0.5 | | 8.0 | 5,139 | >10,000* |
| WV FA(7132-1)/Niles BA | H | 0.5 | 0.5 | | 6.0 | 6,469 | >10,000* |
| WV FA(7132-1)/Niles BA | I | 0.5 | 0.5 | | 4.0 | 6,601 | 10,000 |
| WV FA(7132-1)/Niles BA | J | 0.5 | 0.5 | | 3.0 | 9,000 | 9,500 |
| WV FA(7132-1)/Niles BA | K | 0.5 | 0.5 | | 2.0 | 6,500 | 7,000 |
| WV FA(7132-1)/Niles BA | L | 0.5 | 0.5 | | 1.0 | 7,000 | 6,500 |
| WV FA(7132-1)/Niles BA | A | 0.5 | 0.5 | | 0.0 | 6,500 | 7,000 |

Compression Strength - PSI - ASTM C39

| Description | Mix | FA | BA | Caustic | Load, lbs. | Brick # 1 | Load, lbs. | Brick # 2 | Load, lbs. | Brick # 3 |
|---|---|---|---|---|---|---|---|---|---|---|
| WV FA(7132-1)/Niles BA - 10/1/21 | A | 0.5 | 0.5 | 4.0 | 14530 | 10,216 | 18,540 | 10,093 | 12,830 | 8,075 |
| WV FA(7132-1)/Niles BA - 10/1/21 | B | 0.5 | 0.5 | 8.0 | 14330 | 13,040 | 12,290 | 8,642 | 15,950 | 13,008 |
| WV FA(7132-1)/Niles BA - 10/1/21 | C | 0.5 | 0.5 | 12.0 | 11460 | 9,022 | 18,470 | 11,215 | 18,480 | 13,000 |

FIG. 2A

| | caustic | | | | | caustic remake | | |
|---|---|---|---|---|---|---|---|---|
| | 0m | 16m | 14m | 12m | 10m | 4m | 8m | 12m |
| | 7132-A | 7132-D | 7132-C | 7132-B | 7132-F | 7132-I | 7132-G | 7132-B2 |
| quartz $SiO_2$ | 4.96 | 0.52 | 0.68 | 1.35 | 1.81 | 0.52 | 1.33 | 1.45 |
| mullite $Al_6Si_2O_{13}$ | 8.55 | 7.00 | 5.78 | 6.91 | 7.49 | 7.00 | 4.77 | 5.15 |
| calcite $CaCO_3$ | 3.18 | 3.05 | 3.52 | 3.43 | 4.74 | 3.05 | 4.06 | 4.43 |
| tobermorite $Ca_{2.25}(Si_3O_{7.5}(OH)_{1.5}(H_2O)$ | 0.00 | 0.00 | 0.00 | 0.00 | 0.52 | 0.00 | 1.32 | 0.81 |
| hematite $Fe_2O_3$ | 6.38 | 5.98 | 5.08 | 4.40 | 3.69 | 5.98 | 5.25 | 5.43 |
| magnetite $Fe_3O_4$ | 2.61 | 2.15 | 1.73 | 2.32 | 2.50 | 2.15 | 1.85 | 2.24 |
| katoite $Ca_3Al_2(OH)_{12}$ | 3.48 | 5.09 | 4.95 | 5.86 | 5.48 | 5.09 | 3.59 | 5.52 |
| nosean-CO3 $Na_8(AlSiO_4)_6(CO_3)_{1.09}$ | 7.55 | 0.00 | 0.00 | 0.47 | 0.66 | 0.00 | 2.32 | 0.00 |
| chabazite-Na $Na_{3.16}Al_{3.72}Si_{8.28}O_{24}(H_2O)_{9.68}$ | 0.00 | 6.46 | 5.26 | 4.99 | 4.53 | 6.46 | 3.28 | 5.07 |
| analcime $Na(AlSi_2O_6)(H_2O)$ | 0.00 | 2.96 | 2.36 | 3.23 | 1.37 | 2.96 | 0.99 | 1.86 |
| amorphous | 0.00 | 0.29 | 0.91 | 0.82 | 1.02 | 0.29 | 0.61 | 0.59 |
| | 63.29 | 66.85 | 70.11 | 66.54 | 66.54 | 66.51 | 71.02 | 67.42 |

FIG. 2B

CAUSTIC BASED MATERIAL BUILDING METHODS AND APPARATUS

CROSS-REFERENCE TO RELATED APPLICATIONS

None.

FIELD OF THE DISCLOSURE

Aspects of the disclosure relate to brick and/or cementitious mixture making. More specifically, aspects of the disclosure relate to methods of making mixtures for building materials with caustic components.

BACKGROUND

For many years, there has been a continuing effort to develop structural product technologies. Of these continuing efforts, different technologies stress different patentable ideas. For example, some technologies relate to the production of structural products based primarily on coal combustion residues. These technologies are founded upon technologies that use calcium silicate to help fabricate building materials such as structural bricks or blocks. Such technologies are an alternative to cement bonded products more commonly found in the United States.

Following these developments, further technological developments have occurred. These technological developments include a broader range of feedstocks that include various silicate material such as clays, and other residues from multiple hard rock mining and milling operations. An advantage of some of these technologies include inclusion of very fine material particles.

In the above described technologies, the products created or generated showed good strength and meet certain material quality specifications. A deficiency in these technologies; however, is that they show a relatively high water absorption level that can result in premature fractures for the final product during freeze thaw cycling. After successive freezing and thawing cycles, the ultimate product degrades. Projects that use building components are designed for an extensive lifecycle; therefore, premature degradation is a very serious concern with designers who select products for use. As a result of these concerns, while the qualities of these products are good in some aspects, designers shy away from using them on a more regular basis.

To counter the above problem, technologies have been developed where different additives may be provided to mixtures to reduce the absorption tendency of these mixtures. Unfortunately, conventional additives that have been tested are either not effective enough, too expensive, or decrease water absorption at the cost of reducing compressive strength values.

Conventionally, there are various post production coatings that may be applied to the outside of a structural block. These coatings would reduce the amount of absorption into the structural block or brick. This solution; however, does not provide a full answer to what is needed by the industry. First, coatings may be chipped or damaged on the outside of the structural blocks, thereby impacting the overall water absorption capability. Secondly, the use of coatings on the outside of bricks or blocks is an additional expense to the overall manufacturing cost of the finished product. Further drawbacks of conventional products and apparatus is that such products must be dried in a kiln. The overall energy efficiency of production of building materials; therefore, is very limited as great amounts of energy are required by the kiln in the ultimate preparation of the product. Moreover, the amount of carbon dioxide, designated as a greenhouse gas, that is produced during the production of conventional materials is extremely high. There is a need to provide a method of production of structural materials that is greener than conventional methods and that does not produce greenhouse gas emissions to the quantities currently produced.

There is a need to provide an apparatus and methods that enable the production of structural materials with ease compared with conventional apparatus and methods.

There is a further need to provide apparatus and methods that do not have the drawbacks of water absorption as discussed above.

There is a still further need to reduce economic costs associated with operations and apparatus described above with structural material fabrication.

There is a further need to provide a structural material that is stable over time and does not degrade with freeze/thaw cycles.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for making a caustic-based building material is disclosed. The method may comprise retaining material constituents of the building material. The method may also comprise mixing dry constituents of the material constituents of the building material to result in a mixed dry constituent mixture. The method may also comprise adding a caustic solution to the mixed dry constituent mixture to form a resultant mixture. The method may also comprise placing the resultant mixture in a form. The method may also comprise compressing the resultant mixture in the form and curing the resultant mixture.

In another example embodiment, a method for making a caustic-based building material is disclosed. The method may comprise mixing at least one of a lime, a fly ash, and a bottom ash, together to form a mixed dry constituent mixture. The method may also comprise adding a solution of sodium hydroxide to the mixed dry constituent mixture to form a resultant mixture. The method may also comprise placing the resultant mixture in a form. The method may also comprise compressing the resultant mixture in the form and curing the resultant mixture.

In another example embodiment, a method for making a caustic-based building material is disclosed. The method may comprise mixing at least one of a lime, a fly ash, and a bottom ash, and a solution of sodium hydroxide to form a resultant mixture. The mixture may further comprise placing the resultant mixture in a form. The mixture may further comprise compressing the resultant mixture in the form and curing the resultant mixture.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are therefore not be considered limiting of its scope, for the disclosure may admit to other equally effective embodiments.

FIGS. 2A and 2B are spreadsheets of test results for a final product made by the method of FIG. 1.

Figure 1:
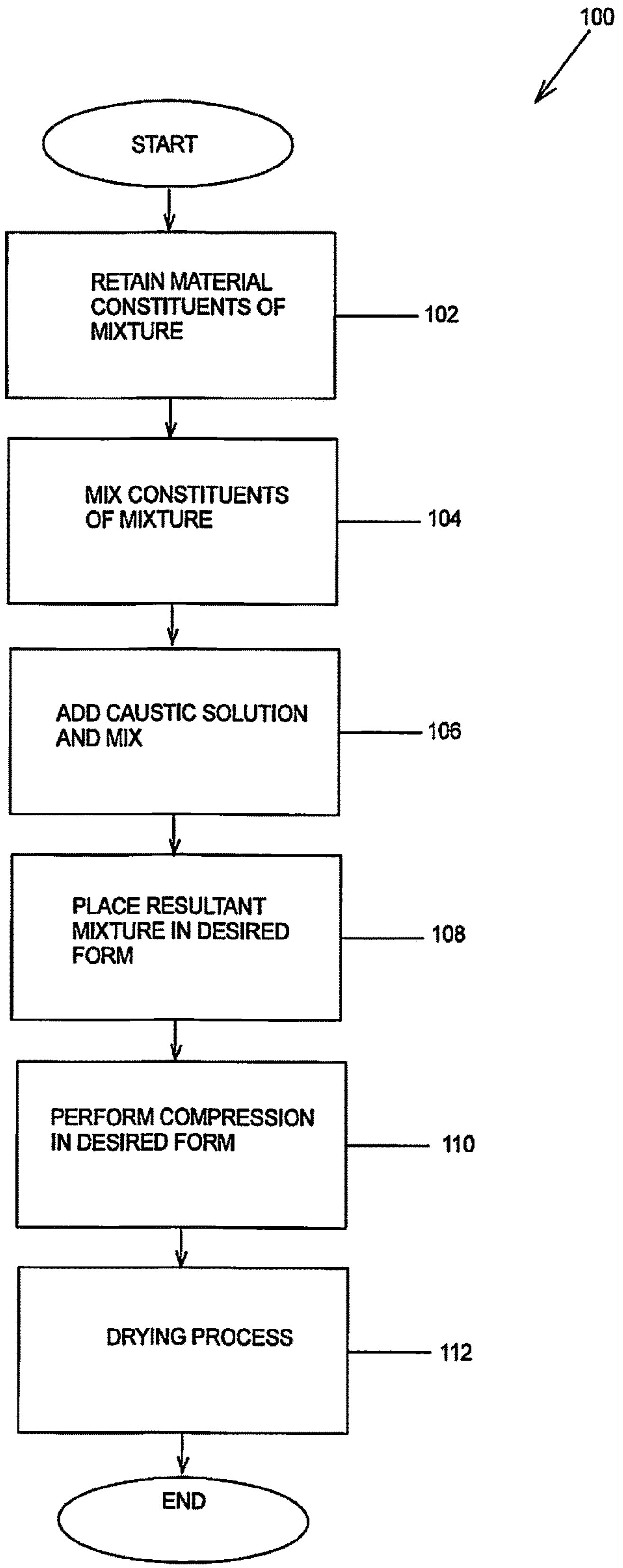
FIG. 1 is a method for production of a structural block in one example embodiment of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Embodiments described herein involve a method for producing a building material that is rugged and sturdy for use in building as well as a final product produced by such a method. As indicated herein, a building brick may be made for standard construction purposes. Other forms of a structural building material may be formed, including a standard block shape or other desired structural shape. In embodiments, the building material has a relatively high compressive capability compared to conventionally made bricks/blocks, while having a relatively lower water permeability. The embodiments described herein provide a surprising result, namely a greater compressive strength coupled with a lower permeability, something not achieved by conventional apparatus.

Referring to FIG. 1, a method 100 of making a building material is illustrated in accordance with one example embodiment of the disclosure. The method 100 entails, at 102, the step of retaining the material constituents of the mixture to be made. In one example embodiment, the material constituents include a lime, fly ash, bottom ash, and a caustic solution. These materials should not be considered limiting. As will be understood, other dry materials may be added. These materials may be inert to the entire matrix of the overall product and not absorb water. Such materials may include rock and sand, as non-limiting embodiments. At 104, the method includes mixing the dry constituents of the mixture. At 106, the method includes adding caustic solution and mixing the entire mixture. In one example embodiment, the caustic solution may be a solution of sodium hydroxide. At 108, the method further includes placing the resultant mixture in a desired form. At 110, the method further includes compressing the mixture in the desired form. The compression may occur through a hydraulic press, in one example embodiment. The compression may be performed through any weight addition, as desired. In some embodiments, the compression may be deleted. At 112, a drying process can occur. In one example embodiment, the drying process can include drying the mixture at 180 to 225 degrees C. for 4 to 8 hours at a pressure of 140 to 350 psi. As will be understood, other methods may be used and the above-identified method is but one example. In other embodiments, all of the ingredients may be added together at one time resulting in the resultant mixture.

The apparatus and methods herein provide a surprising result, compared to conventional apparatus that cannot be achieved by conventional methods. Embodiments of the disclosure provide for adding an aqueous mixture containing a caustic as a portion of the feed mix in processing materials. The resulting bricks are then cured and strength tested.

In one example embodiment of the disclosure, a mix of equal weights of fly ash and bottom ash, 12% hydrated lime and a 14M molar concentration of aqueous caustic solution are mixed together. As will be understood, the fly ash and bottom ash may be byproducts of a coal combustion process used to make electrical energy, for example. The green mix is pressed at 5000 pounds per square inch and cured for eight (8) hours in an autoclave with saturated steam at 190 degrees C. The results are presented below and compared to a "standard method" of making a structural material which is the same as Mix B without the caustic addition:

TABLE 1

| | Mix A Standard Method | Mix B Caustic Addition |
|---|---|---|
| 1 hour Water Absorption % | 17.6 | 11.5 |
| Compressive Strength | 5750 | 10,000 |

Based upon the above, a test matrix was performed with fly ash and bottom ash mixes and various caustic concentrations in the aqueous component. The details of this test matrix are presented in FIGS. 2A and 2B.

In the data summary presented in FIGS. 2A and 2B, different molar solutions of sodium hydroxide have been added to the dry mixture. Values of no sodium hydroxide up through 16M of sodium hydroxide have been added and then pressed into a desired form at 5000 pounds per square inch. Cold water absorption is listed in the chart. As can be seen from the data, the amount of absorption is significantly reduced compared to the control mixture without caustic addition.

As illustrated in the further components of FIGS. 2A and 2B, 1 hour absorption, 24 hour absorption, 1 hour absorption percentage and 24 hour absorption percentage are illustrated. Presented within the graphs, data indicates that with generalized addition of sodium hydroxide to the dry components produces a decrease in the adsorption over time. Such a result is a surprise and not expected. This is advantageous for freeze/thaw environments where high water content within the matrix of a building material may lead to stresses within the building block that lead to degradation.

As illustrated, the compressive strength of many of the caustic samples exceeded the readout range of the machine used to perform the compression test. To verify the actual compressive strength that exceeded 10,000 psi, three samples from each of the sets representing 4, 8 and 12 molar additions were tested by an outside laboratory equipped to test high compression strength levels.

TABLE 2

| Additive concentration (M) | Compressive Strength (PSI) |
|---|---|
| 4 | 9,500 |
| 8 | 11,600 |
| 12 | 11,100 |

Referring to Table 2 above, a range of additive concentrations are placed within an identical matrix of other components, as described above. The resulting product is then placed within a compression testing machine. For an additive concentration of 4M, the compressive strength of a test sample raises considerably (compared to non-treated samples) to 9,500 pounds per square inch. For an additive concentration of 8M, the compressive strength rises still further to 11,600 pounds per square inch. At greater additive concentrations (12M), the compressive strength decreases slightly to 11,100 pounds per square inch. In relation to the data provided in Table 3, optimal amounts of additive concentrations may be determined to maximize the compressive strength of the resulting product.

Referring to Table 3, an analysis of the final percentages of materials that were included into the mixture before addition of any caustic, as shown. As fly ash and bottom ash constituents can vary widely in their material components, each of the fly ash and bottom ash were subjected to a mineral analysis with the results described below:

TABLE 3

| | | SAMPLE NUMBER | |
|---|---|---|---|
| TYPE | | FLY ASH 7162-1 | BOTTOM ASH 7162-2 |
| QUARTZ | SiO2 | 6.34 | .073 |
| MULLITE | Al6Si2O13 | 7.55 | 8.40 |
| CALCITE | CaCO3 | 2.20 | 0 |
| GYPSUM | CaSO4—2H20 | 3.24 | 0 |
| IRON | Fe | 0 | .38 |
| HEMATITE | Fe2O3 | 4.61 | 11.76 |
| MAGNETITE | Fe3O4 | 8.76 | 0 |
| MAGNESIOFERRITE | MgFe2O4 | 0 | 14.35 |
| CARBON | C (NON-CRYSTALINE) | 1.48 | 0.29 |
| AMORPHOUS | C | 65.81 | 64.09 |
| | | 100.00 | 100.00 |

Figure 3:
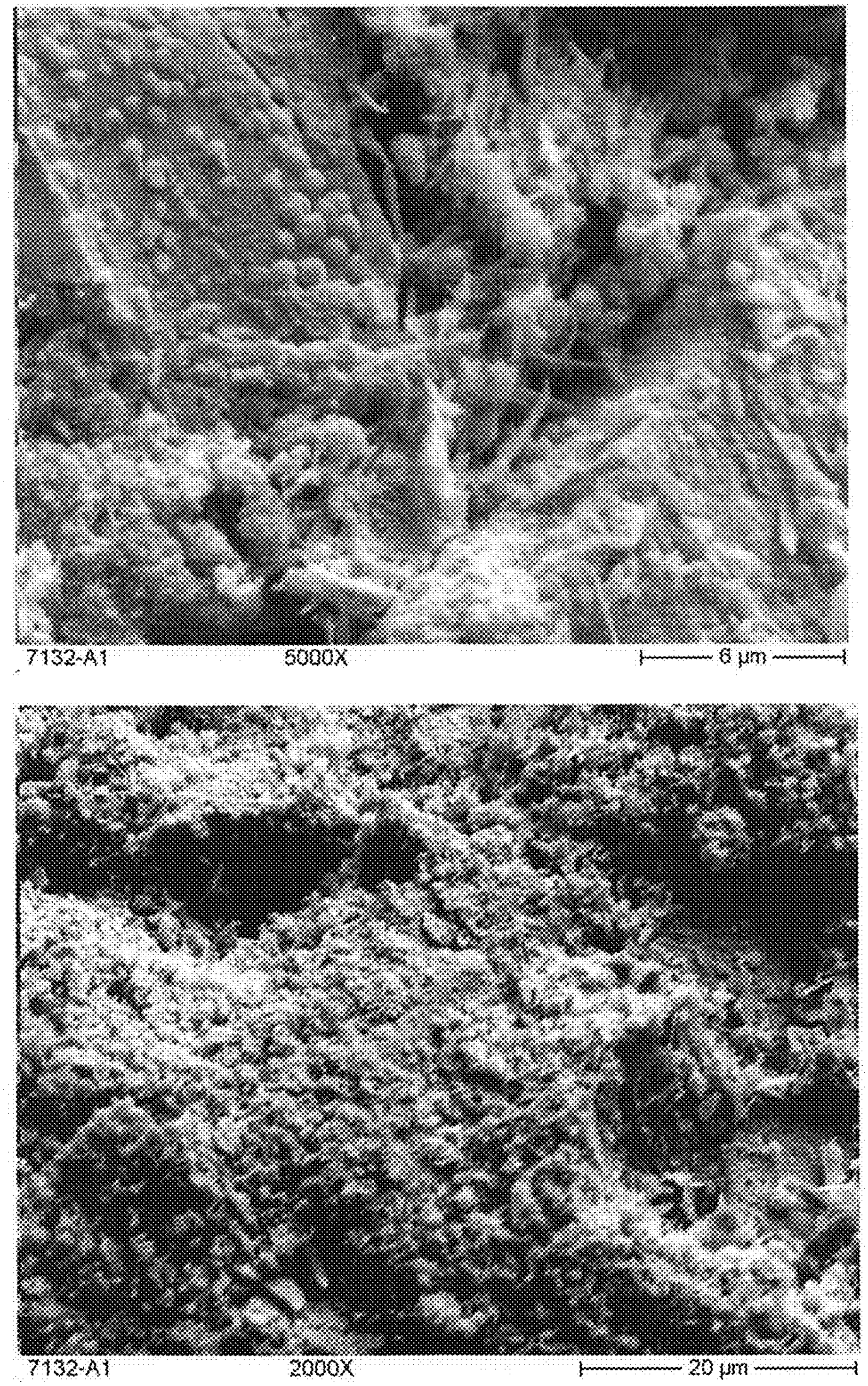
FIG. 3 is a series of photos using a scanning electron microscope of a sample A1.

FIG. 3 is a series of photos using a scanning electron microscope of a sample A1.

Figure 4:
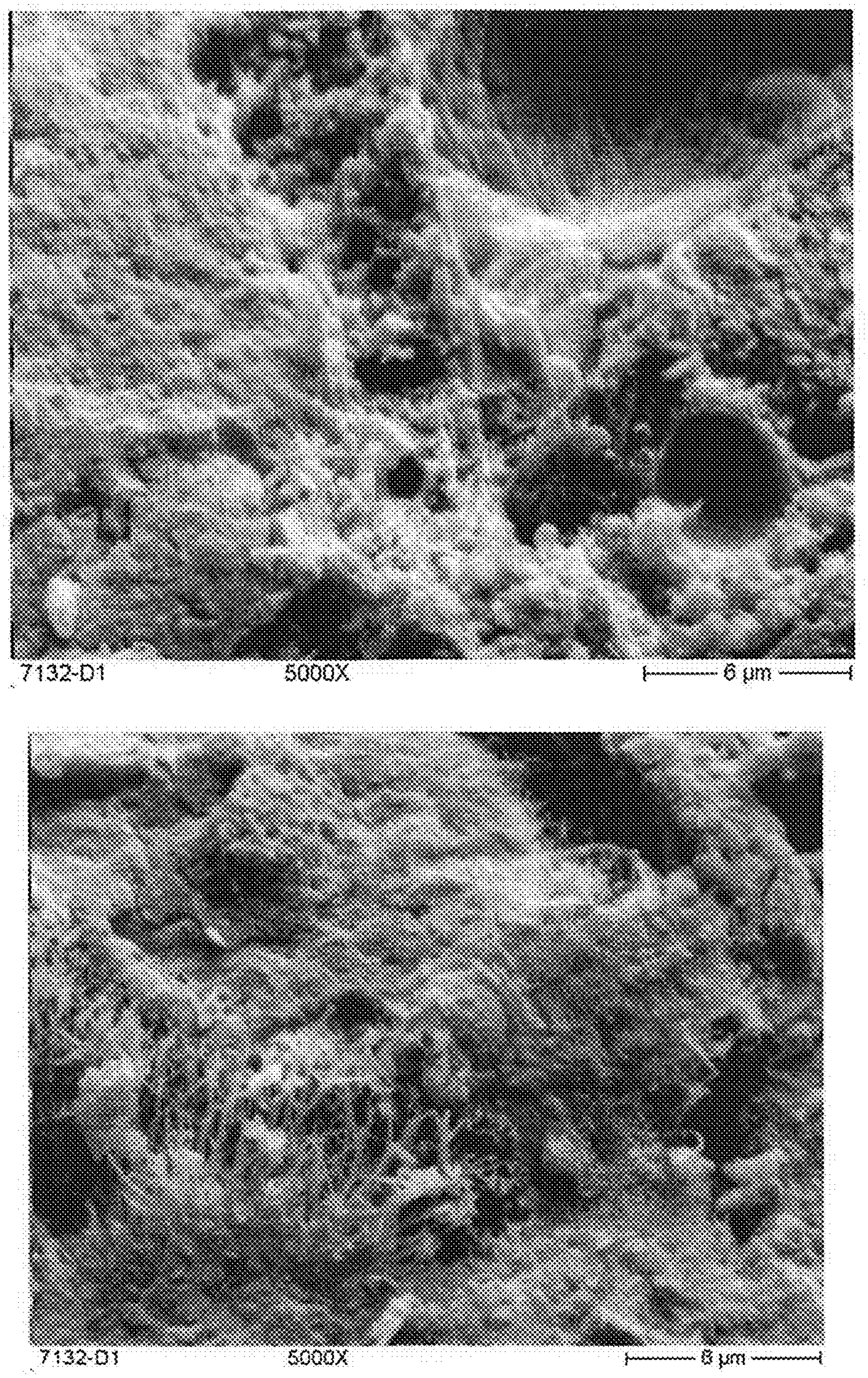
FIG. 4 is series of photos using a scanning electron microscope of a sample D1.

FIG. 4 is series of photos using a scanning electron microscope of a sample D1. Table 4 shows the absorption percentage for standard and caustic mixes.

TABLE 4

| | Standard Mix | Caustic Mix |
|---|---|---|
| Absorption (% 1 hour) | 12.6 | 5.3 |
| Compressive Strength (psi) | 9000 | >10,000 |

In conventional technologies the bonding mechanism within the structural building block was by dissolution of fine silica or silicate materials reacting with the added line to form new crystalline hydrated calcium silicate materials. The essential mineral is tobermorite [CA2.25(Si3)7.5(OH)1.5(H20)].

As noted in the mineralogy, in addition to generating tobermorite in the product, due to the presence of sodium in the mixture, zeolites, for example, are also being formed, and are suspected to be what is providing the additional strength in the cured products.

In the implications provided herein, strength is generated from several factors.

1. The caustic tends to dissolve fine silica rendering it better at coding all the articles in the next and enhancing overall reactivity. It is thought that a mix is generated during curing that is more reactive with the feed mix that is found in a standard mix when the reaction is a solid/solid reaction.
2. The caustic is significantly impacting the surfaces of the free particles, as evidenced by the much smoother services of the scanning electron microscope images compared to the standard mix.
3. The production of additional reaction products in addition to tobermorite contribute to the much greater strength obtained.
4. Lastly, due to the more significant liquefaction of the silicate in the mix, there is a greatly reduced void volume in the cured products leading to the enhanced absorption results found.

As described, methods are described that enable the production of structural materials with ease compared with conventional apparatus and methods.

The methods described do not have the drawbacks of water absorption as discussed above. The products produced by the methods described above do not have the freeze-thaw problems commonly found in conventional products, thus the products produced by the methods are superior in environments that have varying water exposure conditions. The method described also produces materials without the need for a kiln. The aspects of the current invention provide structural materials without the high energy requirements of conventional methods. Such materials are produced at a 70 percent reduction of energy due to the elimination of a kiln. Moreover, the amount of carbon dioxide, designated as a greenhouse gas, that is produced during the production of products using the aspects described is significantly lower. In aspects of the products produced, the requirement of using large mining equipment for production of feedstock materials is also eliminated, contributing even greater to the energy savings.

Embodiments herein provide reduced economic costs associated with operations and apparatus described above with structural material fabrication.

The resulting structural materials are stable over time and do not degrade with freeze/thaw cycles.

In another example embodiment, a method for making a caustic-based building material is disclosed. The method may comprise retaining material constituents of the building material. The method may also comprise mixing dry constituents of the material constituents of the building material to result in a mixed dry constituent mixture. The method may also comprise adding a caustic solution to the mixed dry constituent mixture to form a resultant mixture. The method may also comprise placing the resultant mixture in a form. The method may also comprise compressing the resultant mixture in the form; and curing the resultant mixture.

The method may also be performed wherein the compressing the resultant mixture in the form occurs at 5000 pounds per square inch.

The method may also be performed wherein the caustic solution is sodium hydroxide.

The method may also be performed wherein the sodium hydroxide is less than 16M concentration.

The method may also be performed wherein the sodium hydroxide is 10M concentration.

The method may also be performed wherein the sodium hydroxide is 2M concentration.

The method may also be performed wherein the dry constituents are at least of a rock, a lime, a fly ash and a bottom ash.

The method may also be performed wherein the form is a brick form.

The method may also be performed wherein the form is a block form.

The method may also be performed wherein the resultant mixture is poured into the form.

The method may also be performed wherein the curing of the resultant mixture is in an autoclave.

The method may also be performed wherein a curing temperature of the autoclave is 180 to 225 degrees C.

In another example embodiment, a method for making a caustic-based building material is disclosed. The method may comprise mixing at least one of a lime, a fly ash and a bottom ash together to form a mixed dry constituent mixture. The method may also comprise adding a solution of sodium hydroxide to the mixed dry constituent mixture to form a resultant mixture. The method may also comprise placing the resultant mixture in a form. The method may also comprise compressing the resultant mixture in the form and curing the resultant mixture.

The method may also be performed wherein the compressing the resultant mixture in the form occurs at 5000 pounds per square inch.

The method may also be performed wherein the sodium hydroxide is less than 16M concentration.

The method may also be performed wherein the curing of the resultant mixture is in an autoclave.

In another example embodiment, a method for making a caustic-based building material is disclosed. The method may comprise mixing at least one a lime, a fly ash and a bottom ash and a solution of sodium hydroxide to form a resultant mixture. The mixture may further comprise placing the resultant mixture in a form. The mixture may further comprise compressing the resultant mixture in the form and curing the resultant mixture.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method for making a caustic-based building material, comprising:
- retaining material constituents of the building material;
- mixing dry constituents of the material constituents of the building material to result in a mixed dry constituent mixture;
- adding a caustic solution to the mixed dry constituent mixture to form a resultant mixture, wherein the caustic solution is sodium hydroxide;
- placing the resultant mixture in a form;
- compressing the resultant mixture in the form; and
- curing the resultant mixture wherein the curing occurs in an autoclave in saturated steam at a temperature of 190 degrees C. for 8 hours.

2. The method according to claim 1, wherein the compressing of the resultant mixture in the form occurs at 5000 pounds per square inch.

3. The method according to claim 1, wherein the sodium hydroxide is less than 16M concentration.

4. The method according to claim 1, wherein the sodium hydroxide is 10M concentration.

5. The method according to claim 1, wherein the sodium hydroxide is 2M concentration.

6. The method according to claim 1, wherein the dry constituents are at least one of a rock, a lime, a fly ash and a bottom ash.

7. The method according to claim 1, wherein the form is a brick form.

8. The method according to claim 1, wherein the form is a block form.

9. The method according to claim 1, wherein the resultant mixture is poured into the form.

10. A method for making a caustic-based building material, comprising:

mixing at least one of a lime, a fly ash and a bottom ash together to form a mixed dry constituent mixture;

adding a solution of sodium hydroxide to the mixed dry constituent mixture to form a resultant mixture;

placing the resultant mixture in a form;

compressing the resultant mixture in the form; and curing the resultant mixture wherein the curing occurs in an autoclave in saturated steam at a temperature of 190 degrees C. for 8 hours.

11. The method according to claim 10, wherein the compressing the resultant mixture in the form occurs at 5000 pounds per square inch.

12. The method according to claim 10, wherein the sodium hydroxide is less than 16M concentration.

13. A method for making a caustic-based building material, comprising:

mixing at least one of a fly ash and a bottom ash and a solution of sodium hydroxide to form a resultant mixture;

placing the resultant mixture in a form;

compressing the resultant mixture in the form; and curing the resultant mixture wherein the curing occurs in an autoclave in saturated steam at a temperature of 190 degrees C. for 8 hours.

* * * * *